(12) United States Patent
Hart

(10) Patent No.: US 6,213,565 B1
(45) Date of Patent: Apr. 10, 2001

(54) RAILWAY ELECTRO-PNEUMATIC BRAKE VALVE AND EMULATION METHOD

(75) Inventor: James E. Hart, Trafford, PA (US)

(73) Assignee: Westinghouse Air Brake Technologies Corporation, Wilmerding, PA (US)

( * ) Notice: Subject to any disclaimer, the term of this patent is extended or adjusted under 35 U.S.C. 154(b) by 0 days.

(21) Appl. No.: 09/251,576

(22) Filed: Feb. 17, 1999

Related U.S. Application Data

(60) Provisional application No. 60/075,036, filed on Feb. 18, 1998.

(51) Int. Cl.[7] .................................................... B60T 13/00
(52) U.S. Cl. ...................................................... 303/7; 303/15
(58) Field of Search ................................ 303/3, 7, 15, 20

(56) References Cited

U.S. PATENT DOCUMENTS

| | | | |
|---|---|---|---|
| 3,539,226 | 11/1970 | Barber | 303/20 |
| 3,583,771 | 6/1971 | Dressler, Jr. | 303/20 |
| 3,799,623 | 3/1974 | Wickham et al. | 303/20 |
| 4,316,640 | 2/1982 | Cripe | 303/20 |
| 4,344,138 | 8/1982 | Frasier | 364/426 |
| 4,533,185 * | 8/1985 | Krause | 303/3 |
| 4,859,000 * | 8/1989 | Deno et al. | 303/33 |
| 4,946,229 * | 8/1990 | Deno et al. | 303/33 |
| 5,335,974 | 8/1994 | Klink | 303/7 |
| 5,603,556 | 2/1997 | Klink | 303/22.6 |
| 5,676,431 | 10/1997 | McLaughln et al. | 303/15 |
| 5,722,736 * | 3/1998 | Cook | 303/3 |

* cited by examiner

Primary Examiner—Matthew C. Graham
Assistant Examiner—Robert A. Siconolfi
(74) Attorney, Agent, or Firm—Buchanan Ingersoll, P.C.

(57) ABSTRACT

An electro-pneumatic brake control valve for performing electronic emulation is provided wherein multiple electronic valves control braking operations on freight cars. Multiple pressure sensors are preferably used, and particularly a brake pipe pressure sensor for detecting pneumatic brake commands. In addition to using electronic valves to control brake application and release operations, an electronic quick service valve can selectively exhaust brake pipe to the atmosphere in a controlled rate and amount to assist the propagation of a quick service application and an electronic accelerated release valve can selectively connect emergency reservoir to brake pipe to assist in restoring brake pipe pressure and in propagating a direct release of the brakes. The electro-pneumatic control valve also preferably includes a microprocessor for signal and command interpretation and valve control.

47 Claims, 3 Drawing Sheets ns on electronic brakes sponsored by the Association of
RAILWAY ELECTRO-PNEUMATIC BRAKE VALVE AND EMULATION METHOD This application claims benefit of provisional application 60/075,036, filed Feb. 18, 1998.

BACKGROUND

The present invention relates generally to electronically controlled freight train brakes and, more particularly, to the use of microprocessor controlled electronic valves to perform all brake pipe signal interpretation and relay functions and all brake cylinder pressure application and release functions of conventional pneumatic freight brake control valves.

The present invention contemplates using microprocessor controlled electronic valves, such as solenoid valves, to perform the brake pipe signal interpretation and relay functions as well as the brake cylinder pressure application and release functions of conventional pneumatic freight brake control valves, such as ABD, ABDW or ABDX.

Generally, the concept of electronic emulation of pneumatic control valves has been openly discussed by those of skill in the art and other interested persons at public meetings on electronic brakes sponsored by the Association of American Railroads.

Using electronic transducers to measure brake pipe and brake cylinder pressures, a microprocessor on cars within a train can monitor changes in the trainline brake pipe pressure and respond to such pressure changes by controlling valves which supply or exhaust brake pipe pressure to reinforce the pressure changes and by controlling valves which supply or exhaust brake cylinder pressure in proper accord with increases and decreases in the brake pipe pressure. The basic concept is to duplicate electronically the primary functions performed by conventional pneumatic control valves, including brake cylinder pressure control and brake pipe signal reinforcement for both quick service and accelerated release. With such emulation capability, cars equipped with Electronically Controlled Pneumatic (ECP) brakes, having an on-board electrical power supply or storage device, could be operated either in trains with electrically controlled brakes or in trains operated with pneumatic brakes. Such valves could, in theory, be freely intermixed with pneumatically equipped cars in any train and operated using standard pneumatic control signals.

SUMMARY

An electro-pneumatic brake control valve capable of performing electronic emulation is provided wherein electrically controlled valves, such as solenoid valves, perform similar operations to operations carried out by conventional pneumatic control valves. In such an electro-pneumatic control valve, multiple electronic valves, preferably five, can be used for providing the desired functions performed by the standard pneumatic control valve. These multiple electronic valves can include a first brake cylinder supply valve for selectively connecting emergency reservoir to brake cylinder and a second brake cylinder supply valve for connecting auxiliary reservoir to brake cylinder. A brake cylinder exhaust valve can be provided to reduce or release the brakes by selectively exhausting the brake cylinder to the atmosphere. Also, a quick service valve can be employed to exhaust the brake pipe to the atmosphere in a controlled rate and amount to assist the propagation of a quick service application through each car in the train when operating in an emulation mode. An accelerated release valve can also be provided to connect emergency reservoir to brake pipe to assist in restoring brake pipe pressure and in propagating a direct release of the brakes through each car in the train. In addition to the electronic valves, the electro-pneumatic control valve can include a microprocessor for signal and command interpretation and valve control, and several electronic pressure sensors to measure brake pipe pressure and brake cylinder pressure for signal and control purposes. As installed on the individual rail cars, the electro-pneumatic control valve can simply bolt onto the pipe bracket portion of a conventional pneumatic control valve in place the service portion and can operate in conjunction with standard freight car auxiliary and emergency reservoirs and brake cylinders, as well as with a pneumatic emergency brake pipe venting device. The brake pipe venting device can be a pneumatic emergency portion or a vent valve.

Other details, objects, and advantages of the invention will become apparent from the following detailed description and the accompanying drawing figures of certain embodiments thereof.

BRIEF DESCRIPTION OF THE DRAWINGS

A more complete understanding of the invention can be obtained by considering the following detailed description in conjunction with the accompanying drawings, wherein.

DESCRIPTION OF CERTAIN EMBODIMENTS

Figure 1:
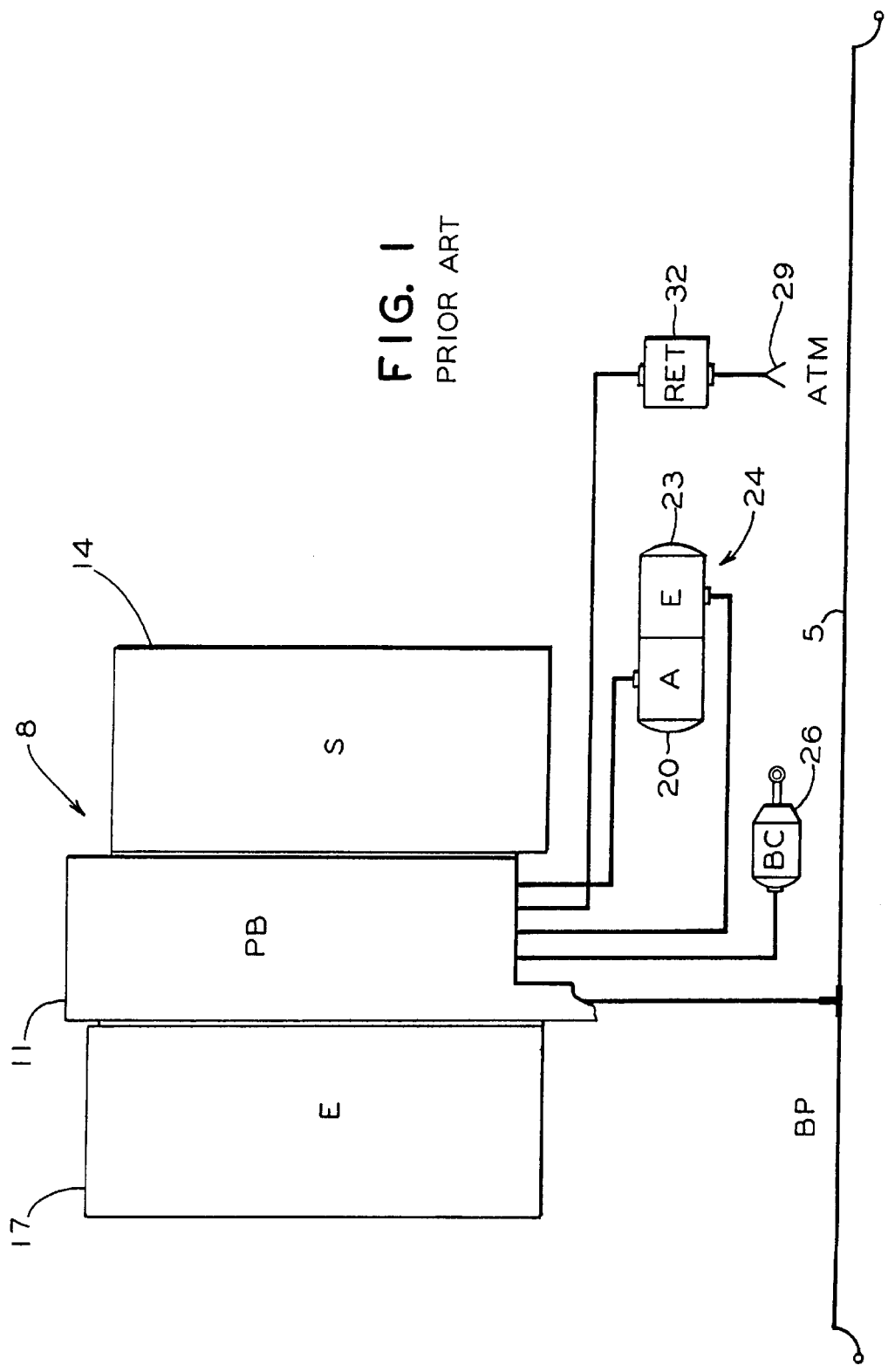
FIG. 1 is a schematic of a prior art freight train braking system on each rail car.

A more complete understanding of the invention may be provided by first describing a conventional pneumatic freight car braking system, such as shown in FIG. 1, wherein a trainline brake pipe (BP) 5 is connected to a standard pneumatic control valve 8, such as an ABD, ABDX or ABDW. The brake pipe 5 connects to the central portion 11, commonly called the pipe-bracket (PB), of the pneumatic control valve 8. Service (S) 14 and emergency (E) 17 portions are connected on either side of the pipe-bracket 11. The pipe-bracket 11 also communicates with auxiliary (A) 20 and emergency (E) 23 reservoir compartments of a dual compartment reservoir 24, the brake cylinder (BC) 26 and the atmosphere (Atm) 29, usually through a retainer (RET) device 32. Each reservoir is charged with pressurized fluid from the brake pipe 5 through ports in the pipe-bracket 11. Similarly, pressurized fluid is selectively communicated through ports in the pipe-bracket 11 between the reservoirs, service and emergency portions, brake cylinder and the atmosphere to control braking and release functions.

Figure 2:
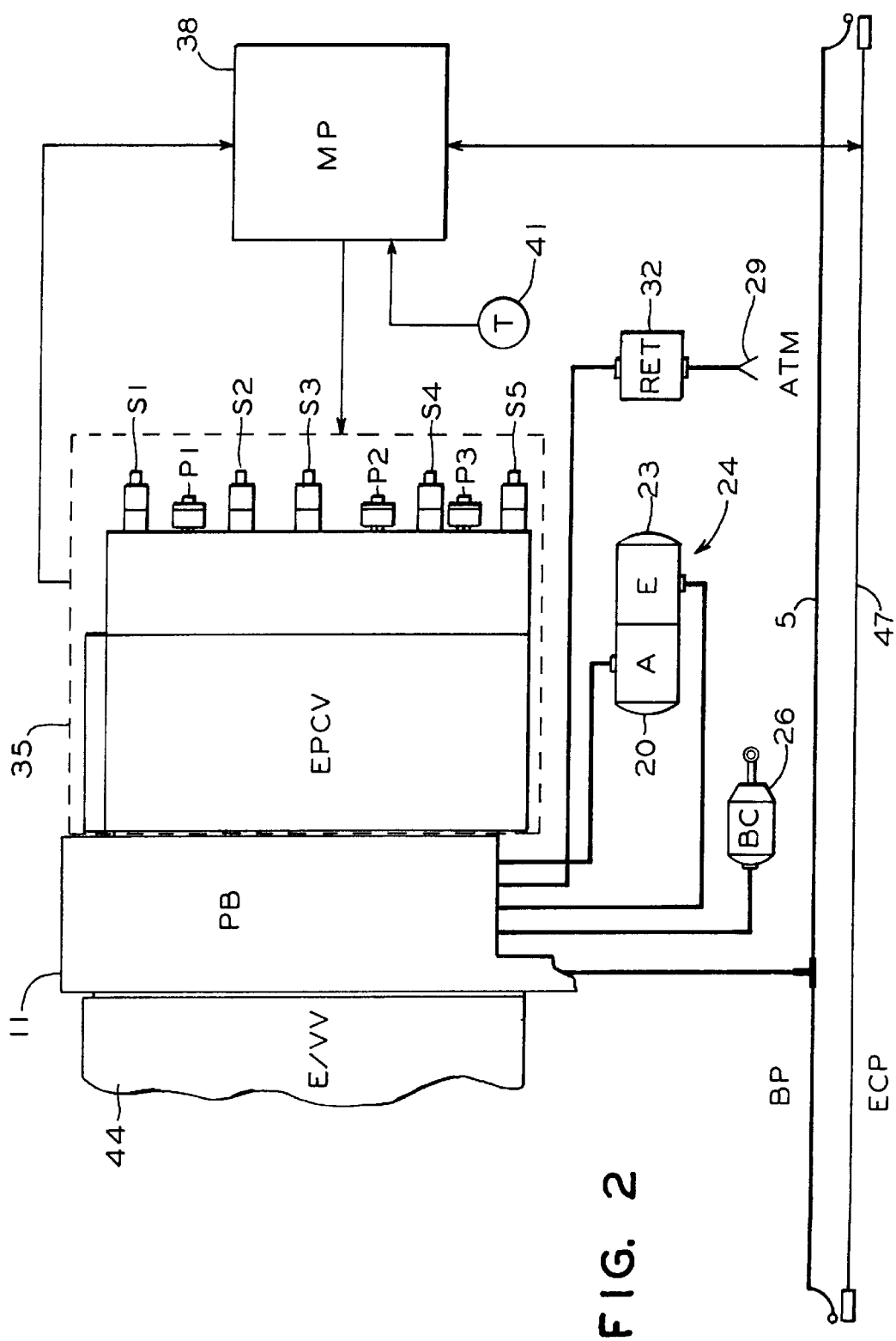
FIG. 2 is a schematic of a freight train braking system having an embodiment of an electro-pneumatic brake control valve according to the invention.
Figure 3:
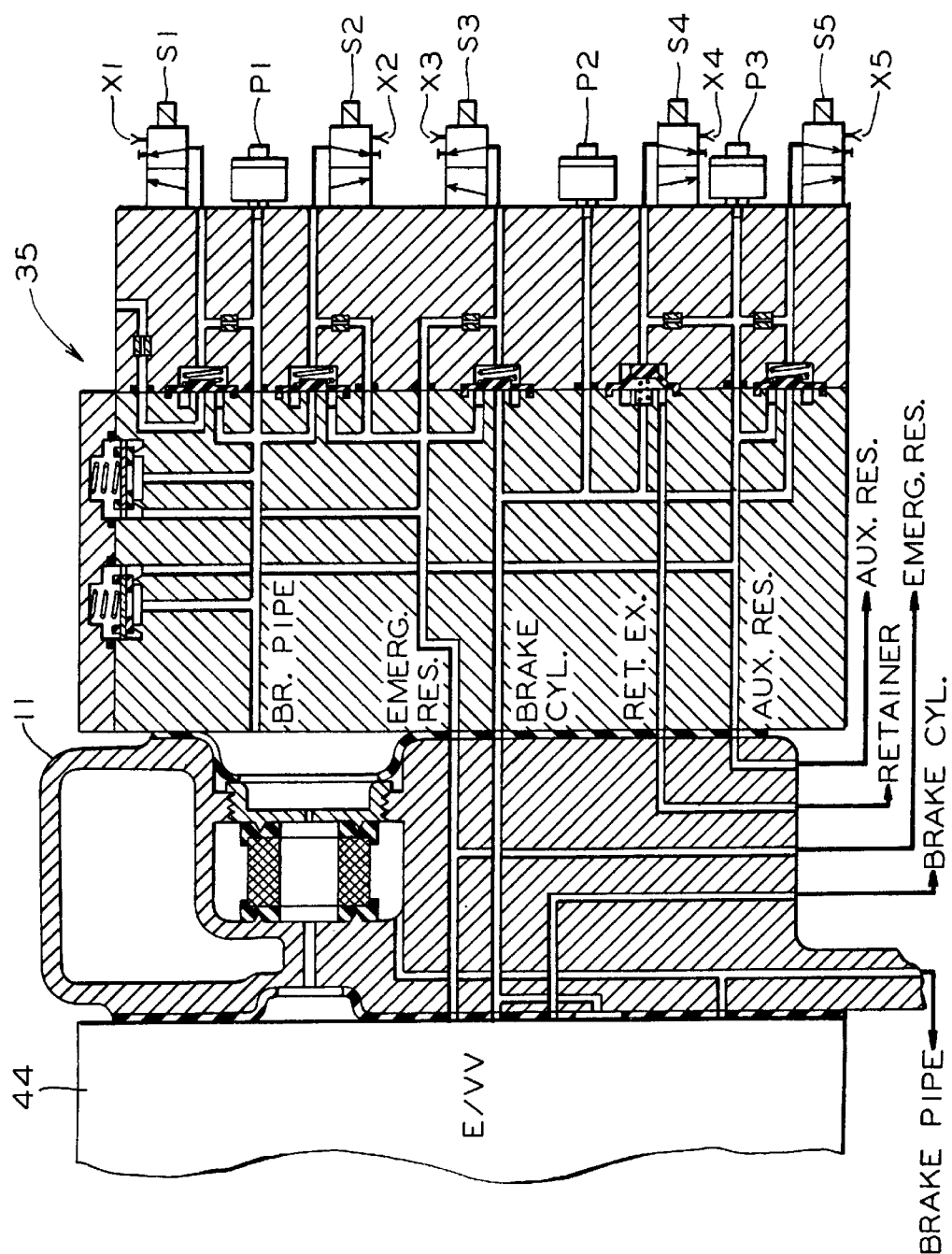
FIG. 3 is a more detailed schematic of an embodiment of an electro-pneumatic freight brake control valve shown in FIG. 2.

An electro-pneumatic brake control valve (EPCV) 35 according to the invention is shown in the schematic of FIG. 2, wherein the EPCV 35 is connected to the pipe-bracket 11 in place of the standard service portion 14. Similarly to the service portion 14, the EPCV 35 selectively communicates between the reservoirs, brake pipe 5, brake cylinder 26 and atmosphere 29 through ports in the pipe-bracket 11. An example of a porting scheme of the pipe-bracket 11 and EPCV 35 is shown in FIG. 3. In the embodiment of the EPCV 35 shown, five electronic valves S1–S5, and three pressure sensors P1–P3, preferably utilized. Information from the electronic valves S1–S5 and pressure sensors P1–P3 is communicated to an electronic controller 38, such as a microprocessor (MP), which can control the operation of the electronic valves to perform the appropriate braking functions at the proper time. A temperature sensor (T) 41 can also be provided to sense ambient temperatures and convey that information to the MP 38. A standard emergency portion 17, or simply a vent valve (VV) 41, is connected to the opposite side of the pipe-bracket 11.

Each of the valves is preferably a 2-way, normally closed solenoid valve, and selectively communicates with certain elements of the brake system through ports in the pipe-bracket 11. Each electronic valve S1–S5 may also communicate with the atmosphere directly through locally provided exhaust ports X1–X5, shown in FIG. 3. The first electronic valve, S1, selectively communicates brake pipe 5 to exhaust to provide the quick service function, while the second electronic valve, S2, selectively connects emergency reservoir 20 to brake pipe 5 for an accelerated release operation. The third electronic valve, S3, selectively communicates emergency reservoir 23 to brake cylinder 26 to implement a brake application and the fourth electronic valve S4 selectively connects brake cylinder 26 to exhaust to release the brakes. The last electronic valve S5 selectively communicates auxiliary reservoir 20 to brake cylinder 26 for brake applications.

Similarly to the electronic valves S1–S5, each of the three pressure sensors P1–P3, communicate with the particular pressure source through porting provided in the pipe-bracket 11. Each pressure sensor can be a conventional pressure transducer. The first transducer P1 can be used to sense the prevailing pressure in the brake pipe 5, while the second transducer P2 can be employed to sense the pressure in the brake cylinder 26. The third transducer P3 can be used to sense the pressure in the auxiliary reservoir 20. Although only three pressure sensors P1—P3 are shown, it is to be understood that additional pressure sensors could be provided to obtain more information for use by the microprocessor in controlling braking functions on the car.

Of the five electronic valves S1–S5 and three pressure sensors P1–P3 shown in FIGS. 2 and 3, all except two of the electronic valves and one of the pressure sensors are known to have been used in conventional ECP freight train braking systems. The two electronic valves which are unique to an electro-pneumatic brake valve according to the invention are the first S1 and second S2 electronic valves. These two valves S1, S2 provide the quick service and accelerated release functions, respectively. The unique pressure sensor is the brake pipe transducer P1 which is associated with the two preceding electronic valves S1, S2, and is utilized to detect pneumatic brake command signals propagated through the brake pipe 5.

FIG. 3 is a more detailed schematic of the basic EPCV 35 shown in FIG. 2, illustrating a presently preferred porting and valve configuration from each of the five electronic valves S1–S5 and three pressure sensors P1–P3 the EPCV 35 through the pipe-bracket 11 to each of the pneumatic elements of the brake system on the freight car. In addition to the capability of performing electronic emulation of conventional pneumatic control valves 8, the EPCV 35 can also have direct electronic brake control capability. Such a direct electronic brake control capability further contemplates the train having an electric, ECP, trainline 47 connected to the microprocessor 38 on each car, as shown in phantom lines in FIG. 2, for receiving the brake command signals electrically as in conventional ECP brake systems. In that case, besides controlling the electronic valves S1–S5 and pressure sensors P1–P3 based upon pneumatic signals propagated through the brake pipe 5, the microprocessor 38 could receive and interpret electrically transmitted brake command signals from a master brake controller on the locomotive.

Referring to the drawing, the five electronic solenoid valves S1–S5 in the embodiment shown are configured to operate as follows:

1. the first valve S1 is a quick service valve to exhaust brake pipe pressure to atmosphere, in a controlled rate and amount, to assist the propagation of quick service through the train when operating in an emulation mode;
2. the second valve S2 is an accelerated release valve to connect the emergency reservoir to the brake pipe to assist in restoring brake pipe pressure and propagating a direct release of the brakes through the train, when in an emulation mode;
3. the third valve S3 is a brake cylinder supply valve for connecting the emergency reservoir to the brake cylinder;
4. the fourth valve S4 is a brake cylinder exhaust valve to reduce or release the brakes by connecting the brake cylinder pressure to the atmosphere; and
5. the fifth valve S5 is a brake cylinder supply valve for connecting the auxiliary reservoir to the brake cylinder.

As explained above, conventional ECP brake control systems are known to utilize the third S3, fourth S4 and fifth S5 electronic valves, as well as the second P2 and third P3 pressure sensors. However, for successful pneumatic emulation, it is essential that the EPCV 35 implement proper quick service and accelerated release functions to ensure the effective pneumatic propagation of the requisite pneumatic signals through the train. To accomplish this, the first P1 pressure sensor is used in combination with the first S1 and second S2 electronic valves both to detect pneumatically transmitted brake commands and to properly achieve certain brake pipe pressure signal reinforcements. Specifically, the first electronic valve S1 implements a quick service function and the second valve S2 implements an accelerated release function. The first pressure sensor P1 monitors the brake pipe 5 pressure and feeds that information to the MP 38 which interprets the prevailing brake pipe 5 pressure and determines what type of brake functions are being signaled. The first pressure sensor P1 enables the EPCV 35 to operate in an entirely pneumatic mode without being dependent upon electric brake signals transmitted from an ECP master controller on the locomotive. This capability provides optimum versatility to the EPCV 35 because an ECP trainline 47 is not required, thus permitting the EPCV 35 to be used in either non-ECP or ECP equipped trains.

The microprocessor 38 controls the first S1 and second S2 valves to implement the quick service and accelerated release functions at the appropriate time, based upon the information received from the brake pipe 5 pressure sensor P1. These two valves S1, S2, together with the first pressure sensor P1 and the MP 38 function to ensure the effective pneumatic propagation of service brake application and release signals through each car in the train.

The Pneumatic Control Valve Quick Service Function

In regard to the quick service function, the conventional pneumatic control valve 8 quick service function and the potentially adverse effects thereon of varying brake pipe 5 lengths, and volume, and cold temperatures is explained below, followed by a detailed description of certain preferred methods employed by an EPCV 35 according to the invention to emulate pneumatic quick service while accounting for different brake pipe lengths/volumes and cold temperatures.

Electronic emulation relies on replicating the functions performed by pneumatic control valves 8 during service and emergency braking, such that effective and compatible operation in a train is assured. Therefore, it is necessary, at a minimum, to account for the functional characteristics, including important nuances, intrinsic to such valves. In ABD, ABDW, and ABDX type pneumatic control valves 8, the quick service function consists of a primary reinforcement of the brake pipe 5 pressure drop (typically referred to as "preliminary quick service") and a secondary or follow-up reinforcement, during the initial phase of all service brake applications. Preliminary quick service is performed by the service graduating valve using a quick service volume, and the secondary phase of quick service is provided by the quick service limiting valve in conjunction with the service graduating valve.

The important purposes of this signal reinforcement are, first, to ensure that a service application propagates reliably through a long train, applying the operative pneumatic control valves 8, and, second, to ensure that it propagates at a relatively rapid speed. In order to trigger quick service and thus assure the subsequent progression of the control valve to a service application, each control valve 8 must experience a drop in brake pipe 5 pressure that meets a minimum combination of an amount and a rate of pressure reduction. The amount of pressure reduction required is about 0.1 psi at a minimum but is somewhat dependent on the rate of pressure reduction. At slower rates, a greater amount of pressure reduction is required to initiate quick service and the subsequent service application.

Two important things occur when a pneumatic control valve 8 moves to preliminary quick service position. First, the charging ports for the auxiliary 20 and emergency 23 reservoirs are cut off from the brake pipe 5. Second, a relatively small amount of brake pipe 5 pressure is locally exhausted to atmosphere at a controlled rate. Until each control valve 8 moves to quick service, the reservoir pressures can feed back into the brake pipe 5, somewhat retarding the pressure reduction. Disconnecting the brake pipe 5 from the reservoirs 20, 23 on each car in succession isolates the brake pipe 5 and allows the brake pipe pressure to be more easily controlled thereafter.

The internal mechanism for triggering quick service in a pneumatic control valve 8 is the pressure differential that develops between brake pipe 5 and auxiliary 20 reservoir pressure across a valve actuating piston. In release position these two chambers are connected by a relatively small choke that allows some dissipation of reservoir pressure back into brake pipe 5, as the brake pipe pressure reduces and a pressure differential begins to develop. This choked connection is not cut off until the control valve 8 is moved from release position to the preliminary quick service position. If brake pipe pressure were to be reduced slowly enough, the reservoir pressure could dissipate through this choke such that the pressure differential required to move to quick service would not be developed. It follows that the faster brake pipe pressure is reduced, the less pressure drop is required, beyond a base minimum, to generate the differential required to trigger quick service.

Because the steepness or rate of reduction of any pressure reduction front naturally attenuates as it travels through the 1¼ inch brake pipe 5, a service reduction initiated by the brake valve on a locomotive must be reinforced along the way as it propagates through the train brake pipe 5. If the pressure reduction were not reinforced, the propagation of the brake application would gradually slow down and could even die out. When each pneumatic control valve 8, in sequence, experiences a sufficient pressure reduction to cause it to move to a quick service position, the control valve then locally exhausts a controlled amount of brake pipe pressure at a controlled rate. This continually reinforces the leading edge of the service reduction and drives it rapidly through the train to promptly and positively apply all of the brakes. Both the rate and the amount of this controlled quick service reduction are quite important. Together, the rate and the amount of pressure drop must be sufficient to cause the rapid application of succeeding control valves 8 in the train under all conditions, yet not so intense as to initiate an emergency application at any one control valve 8.

Brake Pipe Length and Volume

One of the important factors in achieving effective quick service signal reinforcement is proper compensation for the length of the brake pipe 5 and, therefore, the volume of the brake pipe 5 on each car. Individual freight cars may have a brake pipe length of from about 40 feet to about 120 feet, and it is imperative that the quick service pressure reduction be sufficiently intense on long cars and yet not overly intense on very short cars. If the pressure reduction is too intense on short cars it may infringe on the emergency threshold rate and trigger an undesired emergency application. On the other hand, if the pressure reduction is insufficient on longer cars, due to physical pipe length and/or volume, the propagation of the service application can be impeded.

The pneumatic control valves 8 of the type discussed automatically compensate for longer brake pipes 5 and the consequent larger brake pipe volume by remaining in the preliminary, or primary, quick service position for a longer time. The dwell time in preliminary quick service is generally proportional to the brake pipe length. This occurs because the control valve 8 will not advance beyond quick service position until brake pipe pressure has dropped sufficiently to create the higher pressure differential across the piston that is necessary to move the main slide valve to the service position. A longer brake pipe 5 has more volume and therefore requires a greater total volume of air to be exhausted in order to produce any particular pressure drop and pressure differential with respect to the auxiliary reservoir 20.

A control valve 8 having a quick service function that does not compensate for brake pipe length could be ineffectual on very long cars or too intense on very short cars. One example of this would be a valve that fed brake pipe pressure into a small fixed volume through a choke until the two pressures essentially equalized. This would generally produce a controlled quick service drop in brake pipe pressure, but the amount of the drop would be inversely proportional to the car's brake pipe length and volume. At least one conventional pneumatic control valve 8 is known to operate essentially in this manner.

Cold Temperatures

In addition to the length and volume of the brake pipe 5, very cold temperatures can also increase the pressure differentials required to effectively actuate both the quick service and service positions of the pneumatic control valve 8. Such cold temperatures can have some minor affect on lubrication and also tend to cause some unavoidable stiffening of elastomeric compounds used in control valve diaphragms and o-rings. It is helpful to increase the intensity of quick service under these circumstances in order to ensure similarly effective service brake propagation in very cold temperatures. The pneumatic control valve 8 automatically compensates for cold temperatures by staying in the preliminary quick service position for a longer time in order to develop the somewhat higher pressure differentials required to move to the service application position.

Thus, such conventional pneumatic control valves 8 are rather ingeniously designed to be self-compensating, automatically providing the advantageous increase in intensity of quick service demanded both by long brake pipe 5 lengths and by very cold temperatures. It is quite important to understand these functional features and to replicate them properly in any electronic emulating device.

Electronic Emulation of Pneumatic Control Valve Quick Service

An electronic emulator valve must properly compensate for the conditions described above in order to ensure effective propagation of service brake applications through long trains, particularly when such EPCVs 35 are intermixed with pneumatic control valves 8. An EPCV 35 according to the present invention can not only achieve this, but can actually improve upon the quick service function performed by the conventional pneumatic control valve 8 to further enhance service propagation.

In the embodiment shown in FIG. 3, the brake pipe pressure transducer P1 measures the brake pipe pressure, which can be digitized and scanned by the microprocessor 38 at a relatively high frequency. In addition, a temperature sensor 41, such as an electronic thermocouple, can be provided to measure the atmospheric air temperature and can convey this information to the MP 38. When the train brakes are in a release mode and a brake pipe pressure reduction indicative of a service application signal is sensed by the microprocessor 38, the microprocessor 38 can quickly actuate the electronic quick service valve S1 to begin exhausting brake pipe pressure. The pressure can be reduced at each car by a determined amount, as required to achieve a specific change in brake pipe pressure regardless of the length and volume of the brake pipe 5 on each the car. The amount of the quick service reduction may be adjusted by one or both of two factors: prevailing air temperature and the rate of the reduction through a fixed orifice, which would be directly dependent on the effective brake pipe length.

Several preferred methods according to the invention offer different ways to compensate for long brake pipe lengths and cold temperatures. Under normal circumstances, brake pipe pressure is dropped by nominally 2 to about 2.2 psi during quick service. A preferred method for compensating for cold temperatures requires a temperature sensor 41 to monitor ambient conditions. If it is determined that the temperature is below zero degrees Fahrenheit, the method calls for adjusting the nominal 2–2.2 psi pressure drop, increasing it by approximately 0.1 psi for each 5 degrees Fahrenheit below zero, up to a maximum total quick service drop of 3.5 psi.

To compensate for different brake pipe length, a first preferred, and most basic, method of preliminary quick service compensates for brake pipe length to produce the same results as the referenced pneumatic control valves 8. This can be achieved using the electronic quick service valve S1 to exhaust brake pipe pressure through a fixed orifice until the pressure has been reduced by a predetermined amount, such as, for example, 2.2 psi, regardless of the car length and effective brake pipe length between valves. This, of course, requires that the exhaust valve be held open to exhaust more air for longer brake pipe lengths.

In a second preferred method, the electronically controlled quick service valve S1 is opened and the rate of pressure reduction is controlled by a fixed exhaust choke, just as in the first method. With the fixed orifice, the rate of pressure reduction will tend to be generally inversely proportional to brake pipe length. In this method, however, the microprocessor 38 monitors the actual rate of pressure reduction during quick service at each valve S1 and adjusts the amount of the pressure drop to compensate for the slower rate on longer cars. If the rate of brake pipe pressure reduction during preliminary quick service is found to exceed, for example, approximately 2 psi/second, indicating fairly short effective brake pipe lengths, the valve can produce the same 2.2 psi drop as the valve in the first embodiment. However, if this rate of reduction is less than 2 psi/second, the valve can be held open for an even longer time period to increase the total quick service drop on longer cars. For example, the reduction may be increased by approximately 0.1 psi for each 0.2 psi/second slower than 2.0 psi/second the reduction is found to be, up to a maximum drop of approximately 3 psi. Increasing the exhaust time and therefore the total local quick service pressure drop due to slower rates of drop on long cars represents an improvement over pneumatic control valve performance. This improvement may be used to allow greater spacing between valves in an integral train or on multi-unit cars, where other limiting factors on spacing can be overcome.

According to a third preferred method, the primary solenoid quick service valve S1 can be controlled by pulse modulation, such that the effective rate of pressure reduction is controlled by the duration and frequency of the energizing pulses. In this method, a desired optimum rate of brake pipe pressure reduction during quick service can be closely controlled, regardless of the effective brake pipe length or volume. The microprocessor 38 can control the pulse modulation to achieve the desired rate of pressure reduction by increasing the valve duty cycle as necessary to compensate for longer brake pipe 5 lengths. In this case it is generally preferable to maintain a generally fixed amount of quick service pressure drop, such as, for example, 2.2 psi, regardless of the brake pipe length and volume.

A fourth method can be used in a case where unusually long spacing between brake control valves is desired. According to this method, the fixed rate procedure of the third method may be combined with a somewhat greater quick service drop. This would represent a combination of the second and third methods described above.

In a fifth method, the same pressure reduction rate control as described for the third method can be implemented using an electronically controlled variable opening valve. In this case, the rate is controlled by generally proportioning the effective valve opening to brake pipe length, as required to achieve a predetermined rate of pressure reduction.

A sixth method, similarly to the fourth method, involves using the procedure in the fifth method in combination with the second method where unusually long spacing between brake control valves is desired.

If a combination of both reduction rate and low temperature are eligible to influence the pressure drop, the temperature condition will take precedence in a manner as previously described.

In summary, an EPCV 35 according to the present invention, employing various methods, can provide an effective quick service function, thereby assuring the reliable and rapid propagation of service brake applications through long trains. According to the preferred methods described above, several conditions are established to ensure that the proper implementation of quick service is provided for, including:

1. increasing the amount of the quick service pressure drop at very cold temperatures to compensate for the somewhat higher pneumatic valve operating differentials that are likely to prevail;
2. assuring at least a minimum predetermined quick service pressure drop, irrespective of brake pipe length;

3. assuring a minimum predetermined rate of pressure reduction, irrespective of brake pipe length;
4. providing an increased pressure drop above the basic minimum to compensate for somewhat slower rates of drop imposed by longer pipe lengths by using a fixed exhaust valve to increase the amount of the quick service brake pipe pressure drop above the basic minimum;
5. utilizing a combination of two and three; and This assures the fully compatible operation of multiple EPCVs 35 when mixed with conventional pneumatic control valves 8 in the same train. Additionally, a quick service function is provided which is fully effective for greater control valve spacing, or longer effective brake pipe 5 length per control valve, than conventional pneumatic control valves 8 would permit.

Secondary Quick Service

In conventional pneumatic control valves 8, the quick service limiting valve, in conjunction with the service slide valve, performs a secondary quick service function. When the control valve moves to a service position, the slide valve terminates preliminary quick service and initiates secondary quick service. Brake pipe 5 pressure is fed into the brake cylinder port through a small orifice, allowing a continued local reduction of brake pipe pressure at a slower rate of reduction from that of preliminary quick service. Secondary quick service is then terminated by the quick service limiting valve, which cuts off the flow of brake pipe pressure to brake cylinder 26 when the brake cylinder pressure reaches 8 to 12 psi, or nominally to 10 psi.

While preliminary quick service provides the primary brake pipe pressure reduction to propagate the service application through the train, the secondary quick service further reduces brake pipe pressure on each car immediately following the preliminary quick service drop. This provides a reinforcement of the brake pipe pressure reduction so that the preliminary quick service is more effective on the succeeding car.

In electronic emulation mode, the beneficial effect of secondary quick service can be obtained by exhausting brake pipe pressure to atmosphere instead of connecting it to the brake cylinder. This exhaust can be limited by valve modulation to produce a substantially slower rate of reduction of brake pipe pressure than is conventionally produced during preliminary or primary quick service. By monitoring the brake cylinder pressure using the microprocessor 38 and pressure sensor P1, the secondary quick service can be terminated when brake cylinder pressure reaches a predetermined pressure. Alternatively, secondary quick service can be terminated after the expiration of a predetermined time period.

Accelerated Release Function

In regard to the accelerated release function, the conventional pneumatic control valve accelerated release function is explained below, followed by a detailed description of certain preferred methods employed by an EPCV 35 according to the invention to emulate pneumatic accelerated release.

The present invention can replace the conventional pneumatic control valve service portion 14, as shown in FIG. 3. The EPCV 35 also requires the presence of a pneumatic emergency venting device 41 on the opposite side of the pipe bracket 11, which can be either a conventional emergency portion 17 or a vent valve. The electronic accelerated release function must perform both service and emergency accelerated release when operating with a vent valve, but only needs to perform the service accelerated release when operating in conjunction with a full emergency portion 17. Such an emergency portion 17 would perform emergency accelerated release pneumatically in the usual manner.

Conventional pneumatic freight brakes are the direct release type, which means that the brake cylinder pressure cannot be reduced incrementally. When a release is made the control valves 8 operate to exhaust brake pipe pressure completely, and the brake pipe pressure is subsequently normally completely recharged. Furthermore, during service brake applications, only the auxiliary reservoir 20 pressure is used to supply the brake cylinder 26, and emergency reservoir 23 pressure remains at full charge. This is significant, because emergency reservoir 23 pressure is therefore available at full charge to replenish brake pipe pressure during the accelerated service release operation. This is particularly important following light service reductions, where there is not a substantial differential between brake pipe 5 and emergency reservoir 23 pressure.

In a conventional service portion 14, service accelerated release is triggered when a release of a service application is made and brake pipe pressure increases sufficiently to cause a pressure differential of approximately 1.6 to 2 psi between brake pipe 5 and auxiliary reservoir 20. The service accelerated release valve then connects the emergency reservoir 23 to the brake pipe 5 through a fixed orifice to fairly rapidly boost brake pipe pressure and thus propagate the brake release signal through the train. Emergency reservoir 23 flows to brake pipe 5 through a back flow check valve, so that the pressures cannot quite equalize as emergency reservoir 23 pressure decreases and brake pipe pressure increases, due to the pressure differential required to hold this check valve open.

Combined vs. Separate Auxiliary and Emergency Reservoirs

It is certainly possible to connect the auxiliary 20 and emergency reservoirs 23 to form a combined supply reservoir for the purpose of direct electro-pneumatic brake cylinder control. Connecting the reservoirs is one way to allow a single electronic valve to control brake cylinder pressure supply for both service and emergency brake applications. However, this may not be advisable for properly emulating service accelerated release electronically, and it can actually be advantageous to keep the reservoirs separate, even during full electro-pneumatic braking.

While the description describes the EPCV 35 as an emulator using changes in brake pipe pressure as the command signal, it is to be understood that the EPCV 35 can also operate as a stand alone ECP system, in which case it would receive brake command signals electrically from a master controller on the locomotive, typically via an ECP trainline 47. In one preferred method during electronic emulation mode, the standard dual compartment partitioned auxiliary/emergency reservoir 24 can be used with the emergency reservoir 23 supplying pressurized air for emergency applications and the auxiliary reservoir 20 supplying pressurized air for service applications. Likewise, in one preferred method in a full ECP mode, service air can be provided from the nominal emergency reservoir 23 and the emergency air provided from the nominal auxiliary reservoir 20. Using the emergency reservoir 23 allows for higher maximum service brake cylinder pressure. Moreover, sequentially using the two reservoirs can even provide higher emergency braking levels. The switching of the reservoir functions can be done with software in the microprocessor 38 utilizing the two electronic application valves S3, S5. In view of the separate service 20 and emergency reservoirs 23, the microprocessor 38 can modulate the respective electronic application valves S3, S5 to achieve the desired brake cylinder 26 pressure buildup rates.

In electronic emulation mode, brake pipe pressure is not maintained at full charge, as may be done when operating in fill or direct electro-pneumatic mode. Because brake pipe 5 pressure reductions constitute the brake application signals through the train in the emulation mode, brake pipe pressure must be reduced when brakes are to be applied. If the two reservoir compartments were to be connected, the combined supply reservoir pressure would also be reduced somewhat when service brakes are applied because some of the supply reservoir pressure is used to pressurize the brake cylinders 26. Yet, because the combined supply reservoir volume is larger than auxiliary reservoir alone, the combined supply reservoir pressure does not reduce 1 to 1 with brake pipe pressure. Nevertheless, brake pipe pressure can be increased more effectively during accelerated release by using the emergency reservoir 23 at full charge than it can by the combined supply reservoir at a reduced pressure. However, this is most significant only for relatively light service applications. Preferably, the EPCV 35 advantageously maintains the emergency 23 and auxiliary 20 reservoirs separate and feeds emergency reservoir 23 pressure into the brake pipe 5 to perform the accelerated release function.

As described above, the EPCV 35 can replace the service portion 14 on the conventional pneumatic control valve 8. The EPCV 35 can operate in conjunction with standard freight car auxiliary 20 and emergency 23 reservoirs and brake cylinders 26, as well as with a pneumatic emergency brake pipe 5 venting device. The brake pipe venting device can be a conventional emergency portion 17 or simply a vent valve 41, such as, for example, a No. 8 vent valve or a VX vent valve.

Furthermore, although certain embodiments of the invention have been described in detail, it will be appreciated by those skilled in the art that various modifications to those details could be developed in light of the overall teaching of the disclosure. As such, the particular embodiments disclosed herein are intended to be illustrative only and not limiting to the scope of the invention, which should be awarded the full breadth of the following claims and any and all embodiments thereof.

What is claimed is:

1. A brake control valve for a freight car having a brake pipe, auxiliary and emergency reservoirs normally charged with pressurized fluid from said brake pipe, a fluid pressure activated brake cylinder device and an exhaust, said brake control valve comprising:
   a. a electronic controller;
   b. at least one pressure sensor, said at least one pressure sensor detecting pressure in said brake pipe and communicating such pressure to said electronic controller;
   c. a plurality of electrically operated valves controlled by said electronic controller selectively communicating at least said brake cylinder with one of said reservoirs and the atmosphere thereby performing braking and release functions;
   d. at least one of said plurality of electrically operated valves being a quick service valve, said quick service valve controlled to selectively connect said brake pipe to said exhaust;
   e. said electronic controller responding to changes in brake pipe pressure complying with predetermined conditions indicative of pneumatic brake command signals;
   f. said electronic controller responding to reductions in brake pipe pressure by controlling said quick service valve to produce a predetermined pressure drop in said brake pipe;
   g. said electronic controller determining a rate of pressure reduction in brake pipe pressure; and
   h. said electronic controller adjusting said predetermined pressure drop in said brake pipe responsive to said rate of pressure reduction in brake pipe pressure being less than a preselected rate to assist propagation of a pneumatic brake command through said brake pipe providing quick service.

2. The brake control valve of claim 1 further comprising said predetermined pressure drop in said brake pipe being increased nominally 0.1 psi for each nominal 0.2 psi per second said rate of pressure reduction is less than said preselected rate up to said predetermined pressure drop being a maximum of nominally 3.0 psi.

3. The brake control valve of claim 2 wherein said preselected rate is nominally 2.0 psi per second.

4. The brake control valve of claim 1 further comprising said electronic controller controlling said electronic quick service valve to maintain said rate of pressure reduction of pressure in said brake pipe at a preselected rate.

5. The brake control valve of claim 4 wherein said preselected rate is nominally 2.0 psi per second.

6. The brake control valve of claim 4 wherein said quick service valve is a variable opening valve and said electronic controller controls said variable opening valve to maintain said preselected rate of pressure reduction in said brake pipe.

7. The brake control valve of claim 4 wherein said quick service valve is a pulse modulation valve and said electronic controller controls said pulse modulation valve to maintain said preselected rate of pressure reduction in said brake pipe.

8. The brake control valve of claim 1 further comprising:
   a. at least one temperature sensor for detecting ambient temperatures and communicating such to said electronic controller; and
   b. said electronic controller increasing said predetermined pressure drop in said brake pipe responsive a decrease in said ambient temperature.

9. The brake control valve of claim 8 wherein said predetermined pressure drop is increased by nominally 0.1 psi for each nominal 1° F. below 0° F. of said ambient temperature up to a maximum pressure drop of nominally 3.5 psi.

10. The brake control valve of claim 1 wherein said predetermined pressure drop in said brake pipe is nominally 2.0 to 2.2 psi.

11. A brake control valve for a freight car having a brake pipe, auxiliary and emergency reservoirs normally charged with pressurized fluid from said brake pipe, a fluid pressure activated brake cylinder device and an exhaust, said brake control valve comprising:
   a. a electronic controller;
   b. at least one pressure sensor, said at least one pressure sensor detecting pressure in said brake pipe and communicating such pressure to said electronic controller;
   c. at least one temperature sensor for detecting ambient temperature and communicating such temperature to said electronic controller;
   d. a plurality of electrically operated valves controlled by said electronic controller selectively communicating at least said brake cylinder with one of said reservoirs and the atmosphere thereby performing braking and release functions;
   e. at least one of said plurality of electrically operated valves being a quick service valve, said quick service valve controlled to selectively connect said brake pipe to said exhaust;

f. said electronic controller responding to changes in brake pipe pressure complying with predetermined conditions indicative of pneumatic brake command signals;

g. said electronic controller responding to reductions in brake pipe pressure by controlling said quick service valve to produce a predetermined pressure drop in said brake pipe; and h. said electronic controller increasing said predetermined pressure drop in said brake pipe responsive a decrease in said ambient temperature to assist propagation of a pneumatic brake command through said brake pipe and ensure effective quick service.

12. The brake control valve of claim 11 wherein said predetermined pressure drop is increased by nominally 0.1 psi for each nominal 1° F. below 0° F. of said ambient temperature up to a maximum pressure drop of nominally 3.5 psi.

13. The brake control valve of claim 11 further comprising:

a. said electronic controller determines a rate of pressure reduction of pressure in said bake pipe; and b. said electronic controller adjusting said predetermined pressure drop in said brake pipe responsive to said rate of pressure reduction being less than a preselected rate.

14. The brake control valve of claim 11 further comprising said predetermined pressure drop in said brake pipe being increased nominally 0.1 psi for each nominal 0.2 psi per second said rate of pressure reduction is less than said preselected rate up to said predetermined pressure drop being a maximum of nominally 3.0 psi.

15. The brake control valve of claim 14 wherein said preselected rate is nominally 2.0 psi per second.

16. The brake control valve of claim 13 further comprising said electronic controller controlling said electronic quick service valve to maintain said rate of pressure reduction of pressure in said brake pipe at said preselected rate.

17. The brake control valve of claim 16 wherein said preselected rate is nominally 2.0 psi per second.

18. The brake control valve of claim 16 wherein said quick service valve is a variable opening valve and said electronic controller controls said variable opening valve to maintain said preselected rate of pressure reduction in said brake pipe.

19. The brake control valve of claim 16 wherein said quick service valve is a pulse modulation valve and said electronic controller controls said pulse modulation valve to maintain said preselected rate of pressure reduction in said brake pipe.

20. The brake control valve of claim 11 wherein said predetermined pressure drop in said brake pipe is nominally 2.0 to 2.2 psi.

21. A brake control valve for a freight car having a brake pipe, auxiliary and emergency reservoirs normally charged with pressurized fluid from said brake pipe, a fluid pressure activated brake cylinder device and an exhaust, said brake control valve comprising:

a. a electronic controller;

b. a plurality of electronic pressure sensors linked to said electronic controller for measuring at least brake pipe pressure and brake cylinder pressure;

c. at least one temperature sensor for detecting ambient temperature and communicating such temperature to said electronic controller;

d. a plurality of solenoid operated control valves;

e. said electronic controller monitoring brake pipe pressure and responding to changes in brake pipe pressure complying with predetermined conditions indicative of pneumatic brake command signals;

f. said electronic controller determining a rate of pressure reduction in brake pipe pressure;

g. said electronic controller responding to reductions in brake pipe pressure by controlling said plurality of solenoid operated control valves to produce a predetermined pressure drop in said brake pipe;

h. said electronic controller adjusting said predetermined pressure drop in said brake pipe responsive to one of:

i. said rate of pressure reduction in brake pipe pressure being less than a preselected rate to assist propagation of a pneumatic brake command through said brake pipe providing quick service; and ii. a decrease in said ambient temperature to assist propagation of a pneumatic brake command through said brake pipe and ensure effective quick service.

22. The brake control valve of claim 21 wherein said adjusting said predetermined pressure drop in said brake pipe responsive to a decrease in said ambient temperature supersedes said adjusting said predetermined pressure drop in said brake pipe responsive to said rate of pressure reduction in brake pipe pressure being less than a preselected rate.

23. The brake control valve of claim 22 wherein said predetermined pressure drop is increased by nominally 0.1 psi for each nominal 1° F. below 0° F. of said ambient temperature up to a maximum pressure drop of nominally 3.5 psi.

24. The brake control valve of claim 21 further comprising said predetermined pressure drop in said brake pipe being increased nominally 0.1 psi for each nominal 0.2 psi per second said rate of pressure reduction is less than said preselected rate up to said predetermined pressure drop being a maximum of nominally 3.0 psi.

25. The brake control valve of claim 24 wherein said preselected rate is nominally 2.0 psi per second.

26. The brake control valve of claim 21 further comprising said electronic controller controlling said plurality of solenoid operated control valves to maintain said rate of pressure reduction of pressure in said brake pipe at a preselected rate.

27. The brake control valve of claim 26 wherein said preselected rate is nominally 2.0 psi per second.

28. The brake control valve of claim 26 wherein at least one of said plurality of solenoid operated control valves is a variable opening valve and said electronic controller controls said variable opening valve to maintain said preselected rate of pressure reduction in said brake pipe.

29. The brake control valve of claim 26 wherein at least one of said plurality of solenoid operated control valves is a pulse modulation valve and said electronic controller controls said pulse modulation valve to maintain said preselected rate of pressure reduction in said brake pipe.

30. The brake control valve of claim 21 wherein said predetermined pressure drop in said brake pipe is nominally 2.0 to 2.2 psi.

31. A freight brake pneumatic control valve emulation method for a rail car having at least a brake pipe, auxiliary and emergency reservoirs normally charged with pressurized fluid from said brake pipe, a fluid pressure activated brake cylinder device and an exhaust, said pneumatic control valve emulation method comprising:

a. detecting at least brake pipe pressure;

b. interpreting changes in said brake pipe pressure complying with predetermined conditions indicative of pneumatic brake command signals;

c. electronically controlling pressurization and exhaust of said brake cylinder to perform brake application and release operations responsive to said pneumatic brake command signals complying with predetermined conditions;

d. determining a rate of pressure reduction in said brake pipe pressure; and e. electronically controlling exhaust of pressure from said brake pipe to implement a quick service operation by reducing said brake pipe pressure by a predetermined amount responsive to detecting a reduction in said brake pipe pressure; and f. increasing said predetermined amount of reduction in said brake pipe pressure responsive to said rate of pressure reduction being less than a preselected rate.

32. The method of claim 31 further comprising increasing said predetermined amount of reduction in brake pipe pressure by nominally 0.1 psi for each nominal 0.2 psi per second said rate of pressure reduction is less than said preselected rate, up to a maximum reduction of said brake pipe pressure of nominally 3.0 psi.

33. The method of claim 32 wherein said preselected rate is nominally 2.0 psi per second.

34. The method of claim 31 further comprising maintaining said electronically controlled exhaust of pressure from said brake pipe at said preselected rate of pressure reduction until said predetermined amount is achieved.

35. A method of claim 34 wherein said preselected rate of pressure reduction is nominally 2.0 psi per second.

36. The method of claim 34 further comprising maintaining said preselected rate of pressure reduction by controlling the orifice size of a variable opening valve.

37. The method of claim 34 further comprising maintaining said preselected rate of pressure reduction by controlling said electronic valve using pulse modulation.

38. A freight brake pneumatic control valve emulation method for a rail car having at least a brake pipe, auxiliary and emergency reservoirs normally charged with pressurized fluid from said brake pipe, a fluid pressure activated brake cylinder device and an exhaust, said pneumatic control valve emulation method comprising:

a. detecting at least brake pipe pressure;

b. detecting ambient temperatures;

c. interpreting changes in said brake pipe pressure complying with predetermined conditions indicative of pneumatic brake command signals;

d. electronically controlling pressurization and exhaust of said brake cylinder to perform brake application and release operations responsive to said pneumatic brake command signals complying with predetermined conditions;

e. electronically controlling exhaust of pressure from said brake pipe to implement a quick service operation by reducing said brake pipe pressure by a predetermined amount responsive to detecting a reduction in said brake pipe pressure; and f. increasing said predetermined amount of reduction in said brake pipe pressure responsive to a decrease in said ambient temperature.

39. The method of claim 38 wherein said adjusting further comprises increasing said predetermined amount by nominally 0.1 psi for each nominal 1° F. said ambient temperature is below 0° F. up to a maximum reduction in said brake pipe pressure of nominally 3.5 psi.

40. The method of claim 38 wherein said predetermined amount is nominally 2.0 to 2.2 psi.

41. The method according to claim 38 further comprising:

a. determining a rate of pressure reduction of said brake pipe pressure; and b. increasing said predetermined amount of reduction in said brake pipe pressure responsive to said rate of pressure reduction being less than a preselected rate.

42. The method of claim 41 further comprising increasing said predetermined amount of reduction in brake pipe pressure by nominally 0.1 psi for each nominal 0.2 psi per second said rate of pressure reduction is less than said preselected rate, up to a maximum reduction of said brake pipe pressure of nominally 3.0 psi.

43. The method of claim 42 wherein said preselected rate is nominally 2.0 psi per second.

44. The method of claim 41 further comprising maintaining said electronically controlled exhaust of pressure from said brake pipe at preselected rate of pressure reduction until said predetermined amount is achieved.

45. A method of claim 44 wherein said preselected rate of pressure reduction is nominally 2.0 psi per second.

46. The method of claim 44 further comprising maintaining said preselected rate of pressure reduction by controlling the orifice size of a variable opening valve.

47. The method of claim 44 further comprising maintaining said preselected rate of pressure reduction by controlling said electronic valve using pulse modulation.

\* \* \* \* \*